Patented Nov. 1, 1949

2,486,793

UNITED STATES PATENT OFFICE 2,486,793

PIPERIDINE COMPOUNDS AND PROCESS OF MAKING SAME

Karl Miescher, Riehen, and Hans Kaegi, Basel, Switzerland, assignors to Ciba Pharmaceutical Products, Incorporated, Summit, N. J., a corporation of New Jersey No Drawing. Application May 9, 1944, Serial No. 534,800. In Switzerland June 25, 1943

7 Claims. (Cl. 260—293)

The object of the present invention is a process of preparing 4-aryl-piperidine-4-carboxylic acid nitriles, and the corresponding esters, amides and ketones.

These 4-aryl-piperidines are obtained by causing $\alpha$-arylated tertiary-$\gamma$-amino-butyric acid nitriles to react with reactive esters of alkylene-1:2-diols in the presence of acid binding agents in one or more steps, if desired, converting the nitrile group in the 4-aryl-piperidine-4-carboxylic acid nitriles thus obtained into an ester or amide group, and, if desired, splitting off radicals which are suitable for being eliminated and are attached to the cyclic nitrogen, at any phase of the reaction.

As starting products there are used, therefore, $\alpha$-arylated tertiary-$\gamma$-amino-butyric acid nitriles, in which the aryl group may be represented, e. g. by a substituted or unsubstituted phenyl or naphthyl group, the substituents being in any position. The aliphatic radical can be straight or branched or even arranged as part of a ring. For example the following compounds can be used: $\alpha$-phenyl-$\gamma$-(methyl-benzyl-amino)-butyric acid nitrile, $\alpha$-phenyl-$\gamma$-(dimethyl- or diethyl-amino)-butyric acid nitrile, $\alpha$-(benzylhydroxy- or acylhydroxyphenyl)-$\gamma$-(methyl-benzyl-amino)-butyric acid nitriles, $\alpha$-(o-anisyl-$\gamma$-(methyl-diphenylmethyl-amino)-butyric acid nitrile, $\alpha$-phenyl-$\gamma$-(methyl-benzyl-amino)-valeric acid nitrile, $\alpha$-naphthyl-$\gamma$-(dimethyl-amino)-butyric acid nitrile or $\alpha$-phenyl-$\alpha$-[o-(methyl - benzyl - amino) - cyclohexyl]-acetic acid nitrile. The above mentioned starting products are in some instances known or can be obtained in the usual manner.

For the reaction with the above nitriles the following substances, for example, may be used: ethylene - dibromide, ethylene - chloro-bromide, ethylene-diiodide, propylene - 1:2 - dibromide, propylene-1:2-chloro-bromide, butylene-1:2- or 2:3-dibromide, 1 : 2 - dibromo-cyclo-hexane, $\beta$-chloro-ethanol-p-toluene - sulfonic acid ester, glycol-di-p-toluene sulphonic acid ester or propane-1:2-diol-di-methane sulphonic acid-ester.

The reaction itself is carried out in the presence of acid binding agents. For this purpose the following can be used: sodium, potassium, lithium calcium, as such or in the form of their alcoholates, amides or hydrocarbons as, e. g., potassium-tertiary butylate, potassium-tertiary amylate, sodium amide, butyl-lithium, phenyl-sodium or phenyl-lithium. It is advantageous to use inert solvents such as, e. g. ether, benzene, toluene, xylene or hexane and to work in the presence of indifferent gases such as nitrogen. According to the reactivity of the components, the reaction is carried out by cooling, at ordinary temperature or even by heating. It is possible to form the ring in one or more steps.

The nitrile group of the compounds thus obtained may be converted in known manner into an ester group. The nitrile group can also be converted into an amide group in known manner directly or after formation of the carboxyl group.

The piperidines obtained contain a quaternary nitrogen atom. They can be converted into piperidines with tertiary nitrogen, for example, by splitting off alkyl halide by heating. The conversion is also effected easily if there is as a radical attached to the nitrogen, e. g., a mono-, di- or tri-aryl methyl group which can be removed by, among others, the help of catalytic active hydrogen or by treatment with, e. g., acids or by heating. This conversion can moreover be carried out at any desirable phase of the reaction.

The process is further elucidated by formulae on the basis of the following example:

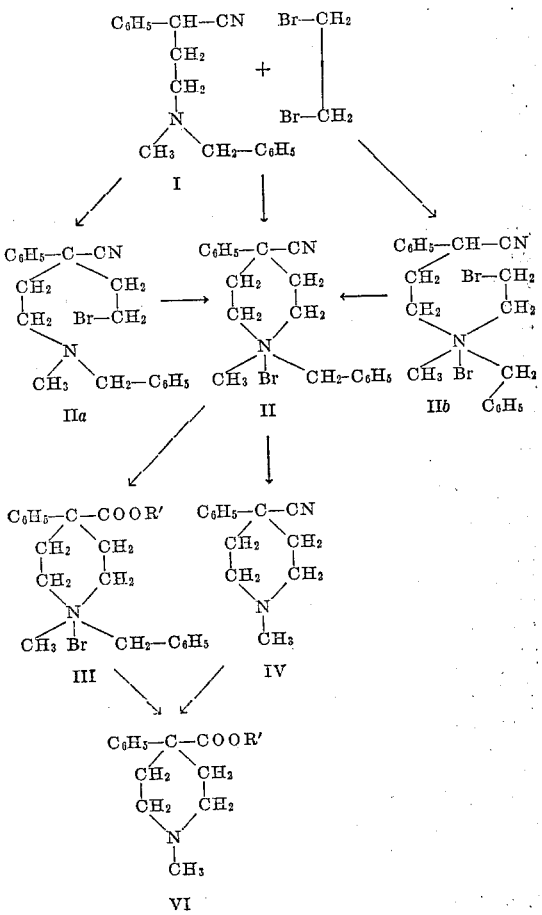

$R'$ = substituted and unsubstituted hydrocarbon radicals

According to the present process a large number of piperidine compounds can be obtained. As a result of the considerable possibilities of variation, numerous new compounds are accessible in addition to known compounds. Of particular interest is the discovery that, for example, the reaction of ethylene-dibromide with Compound I according to the above table leads pre-eminently to cyclic compounds and not to acyclic ones. It also seems surprising, for example, that the conversion of Compound II into Compound IV by catalytic hydrogenation occurs without attacking the nitrile group.

Reference is made to our related copending applications Serial No. 530,742, filed April 12, 1944, now Patent 2,486,792, and Serial No. 592,535, filed May 7, 1945, now Patent 2,486,794.

*Example 1*

52.8 parts of α-phenyl-γ-(methyl-benzyl-amino)-butyric acid nitrile (B. P. 0.1 mm. 153–155° C., prepared from benzyl cyanide and β-chloroethyl-methyl-benzyl-amine in the presence of sodium amide) in 200 parts of ether are added drop by drop while stirring to 10 parts of powdered sodium amide which is suspended under nitrogen in 200 parts of ether. When the reaction is complete, the mixture is stirred for an hour, then 300 parts of ether are added, the whole is cooled with ice and 40 parts of ethylenedibromide are added. Stirring is then carried out again for an hour under ice cooling, for another hour at room temperature and for 4 to 5 hours by heating to 40° C. A thick suspension of salts is formed. This is decomposed with water and aqueous hydrobromic acid is added until the acid reaction occurs. The 1:1-methyl-benzyl-4:4-phenyl-cyano-piperidinium bromide formed, which is difficultly soluble in water, is precipitated and is isolated by suction and washing with ether and water. It still contains some hydrobromide of the starting product as well as other by-products. For purification the crude bromide is dissolved in the just necessary quantity of boiling water, soda solution is added and the mixture is allowed to cool. The thick mass is thoroughly shaken with ether which absorbs the non-quaternary bases. After suction filtering and washing with water and ether the remaining salt is recrystallized from the fourfold quantity of boiling water. Thus a good yield of the pure 1:1-methyl-benzyl-4:4-phenyl-cyano-piperidinium-bromide is obtained in two crystalline forms, as glossy flakes and as white aggregates, which cannot be converted into each other and probably represent cis-trans-isomers. The melting point of both bromides is not sharp and lies at about 245 to 260° C.

If the bromide is shaken up in aqueous alcoholic solution with hydrogen and palladium black, 1-methyl-4:4-phenyl-cyano-piperidine is formed almost quantitatively from both crystalline forms by cleavage of toluene. The 1-methyl-4:4-phenyl-cyano-piperidine can be saponified and esterified with ethanol in known manner to produce 1-methyl-4:4-phenyl-carbethoxy-piperidine.

The same substance is obtained, if the quaternary bromide is heated with sulphuric acid of about 70 to 80 per cent strength, the resulting acid esterified with ethanol and the product subsequently hydrogenated.

If α-phenyl-γ-(methyl-benzyl-amino)-butyric acid nitrile is caused to react with ethylene-dibromide without sodium amide, the quaternary compound corresponding to Formula IIb is obtained which can be converted, with the help of, e. g., potassium-tertiary butylate, into 1:1-methyl-benzyl-4:4-phenyl-cyano-piperidinium bromide. The Compound IIb is also obtained if, by using this method, one starts from ethylene-bromohydrin instead of ethylene-dibromide and the hydroxyl group in the intermediate product obtained is replaced by bromine.

*Example 2*

A solution of 52.8 parts of α-phenyl-γ-(methyl-benzyl-amino)-butyric acid nitrile in 200 parts of ether is added drop by drop to 10 parts of powdered sodium amide in 200 parts of ether. After stirring for 1 hour, a solution of 50 parts propylene-1:2-dibromide in 100 parts of ether is added. The ether slowly reaches its boiling point which is maintained for 2 hours by external heat. In this reaction only sodium bromide is precipitated and no quaternary salt. On decomposition with water an etheral and an aqueous layer are obtained which are easily separated. After evaporation of the ether an oil remains which after prolonged heating on the water bath becomes solid and insoluble in ether. Therefore the formation of the ring of the quaternary bromide occurs only after applying considerable heat. The product is triturated with ether, filtered with suction and thus the 1:1-methyl-benzyl-2-methyl-4:4-phenyl-cyano-piperidinium bromide is obtained. The product is dissolved without further purification in the tenfold quantity of alcohol of 50 per cent strength and after the addition of about 2 per cent of a platinum catalyzer shaken up with hydrogen. When no more hydrogen is absorbed, the whole is filtered with suction, a greater part of the liquid is evaporated and the residue is rendered alkaline and extracted with ether. On evaporation the ether leaves behind an oil, which boils under a pressure of 0.07 mm. at 107 to 110° C. This is the 1:2-dimethyl-4:4-phenyl-cyano-piperidine. It can be saponified and esterified according to known methods whereby with the use of ethyl alcohol 1:2-dimethyl-4:4-phenyl-carbethoxy-piperidine is obtained which forms an oil boiling at 105–108° C. under a pressure of 0.15 mm.

As starting product α-(m-nitro-phenyl)-γ-(methyl-benzyl-amino)-butyric acid nitrile, e. g., can also be used and the nitro group in the resulting compounds converted in usual manner into an amino- or a hydroxy group.

The 1:2-dimethyl-4:4-phenyl-cyano-piperidine obtained can further be converted in known manner into the 1:2-dimethyl-4-phenyl-piperidine-4-carboxylic acid amide by partial saponification. For the manufacture of amides the obtained nitrile can also be completely saponified, the acid thus obtained can be converted into the acid chloride by treatment for example with thionyl chloride, and the acid chloride reacted with ammonia or amines. Thus, from the corresponding acid chloride and diethylamine there is obtained 1:2 - dimethyl-4-phenyl-piperidine-4-carboxylic acid amide.

These amides can also be obtained by converting the above obtained 1:1-methyl-benzyl-2-methyl-4:4-phenyl-cyano-piperidinium bromide into the amides and subsequently splitting off the benzyl group.

In an analogous manner the following compounds may be produced: 1:2:3-trialkyl-4:4-phenyl-carbalkoxy-piperidines, such as 1:2:3-tri-methyl-4:4-phenyl-carbethoxy-piperidine or 1 - alkyl - 4 : 4 -phenyl - carbalkoxy - decahydroquinolines, such as 1-methyl-4:4-phenyl carbethoxy-decahydroquinoline.

*Example 3*

A solution of 65 parts of α-phenyl-γ-(diethyl-amino)-butyric acid nitrile in 200 parts of absolute ether is added drop by drop to 14 parts of powdered sodium amide in 300 parts of ether. After an hour's stirring 300 parts of ether are added, the mixture cooled with ice and then 60 parts of ethylene-dibromide added. Stirring is carried out for one hour at ice temperature, for another hour at room temperature and four to six hours at the boiling temperature of the ether. The very consistent reaction mass is separated by filtration with suction, washed with ether and dried. 125 parts of a white salt mixture are obtained which consists, besides sodium bromide, chiefly of 1:1-diethyl-4:4-phenyl-cyano-piperidinium bromide. The latter is readily soluble in water. By treating with alcohol, the insoluble sodium bromide contained therein can be eliminated. If the piperidinium bromide or the hydroxide which can be prepared from it, is heated in the vacuum, there is produced by cleavage of ethyl bromide or ethyl alcohol, respectively, the 1-ethyl-4:4-phenyl-cyano-piperidine which is an oil boiling at 110 to 112° C. under a pressure 0.05 mm. It can be saponified and esterified in known manner.

If in one or another of the above examples there are used as starting materials derivatives containing in their aryl nucleus alkyl-hydroxy- or aralkyl-hydroxy-groups, the compounds with free phenolic hydroxyl groups can easily be obtained from the resulting reaction products in known manner by hydrolysis or hydrogenation, respectively.

What we claim is:

1. In a process for the manufacture of a 4-aryl-piperidine, the step of reacting an α-phenyl tertiary γ-amino-butyric acid nitrile of the formula

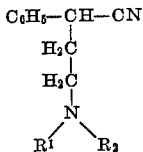

wherein $R_1$ is lower alkyl and $R_2$ is a member selected from the group consisting of lower alkyl and aralkyl, with an alkylene-1:2-dihalide of the formula

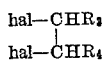

wherein hal is a halogen atom, $R_3$ and $R_4$ are members selected from the group consisting of hydrogen atoms and lower alkyl, in the presence of a dehydrohalogenating agent, whereby a 4:4-phenyl-cyano-piperidinium-halide is formed of the formula

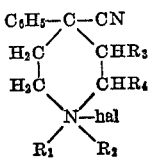

wherein $R_1$—$R_4$ and hal have the same meaning as above.

2. In a process according to claim 1, the additional step of hydrolyzing the resultant product whereby the nitrile group is converted into a carboxyl group.

3. In a process for the manufacture of a 4-phenyl-piperidine, the step of reacting α-phenyl-γ-(methyl-benzyl-amino)-butyric acid nitrile of the formula

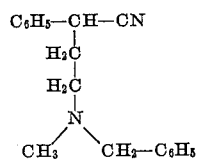

with ethylene-1:2-dibromide in the presence of sodium amide, whereby 1:1-methyl-benzyl-4:4-phenyl-cyano-piperidinium bromide of the formula

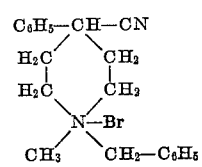

is formed.

4. In a process according to claim 3, the additional steps of hydrolyzing the resultant product whereby the nitrile group is converted into a carboxyl group and then splitting off the benzyl radical by treating the product with catalytically active hydrogen.

5. In a process according to claim 3, the additional steps of hydrolyzing and esterifying the resultant product whereby the nitrile group is converted into an ester group and then splitting off the benzyl radical by treating the product with catalytically active hydrogen.

6. In a process according to claim 3, the additional steps of hydrolyzing the resultant product whereby the nitrile group is converted into a carboxyl group and then splitting off the benzyl radical by a treatment with hydrogen in the presence of palladium black.

7. In a process according to claim 3, the additional steps of hydrolyzing and esterifying the resultant product whereby the nitrile group is converted into an ester group and then splitting off the benzyl radical by a treatment with hydrogen in the presence of palladium black.

KARL MIESCHER.
HANS KAEGI.

REFERENCES CITED

The following references are of record in the file of this patent:

UNITED STATES PATENTS

| Number | Name | Date |
|---|---|---|
| 2,167,351 | Eisleb | July 25, 1939 |

FOREIGN PATENTS

| Number | Country | Date |
|---|---|---|
| 501,135 | Great Britain | 1939 |

OTHER REFERENCES

Archiv. for Exp. Path. Pharm., vol. 196, pp. 127–129.

J. Amer. Chem. Soc., vol. 65, pp. 2093–2095.

Certificate of Correction

November 1, 1949

Patent No. 2,486,793

KARL MIESCHER ET AL.

It is hereby certified that errors appear in the printed specification of the above numbered patent requiring correction as follows:

Column 1, lines 3 and 4, for "esters, amides and ketones" read *esters and amides*; line 48, after the word "lithium" insert a comma; column 5, line 1, after "phenyl" insert a hyphen;

and that the said Letters Patent should be read with these corrections therein that the same may conform to the record of the case in the Patent Office.

Signed and sealed this 7th day of March, A. D. 1950.

[SEAL]

THOMAS F. MURPHY,
*Assistant Commissioner of Patents.*